(12) United States Patent
Chuang (10) Patent No.: US 12,286,189 B2
(45) Date of Patent: Apr. 29, 2025

(54) BIKE SADDLE BAG (71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 160 days.

(21) Appl. No.: 18/181,639

(22) Filed: Mar. 10, 2023

(65) Prior Publication Data

US 2024/0217607 A1   Jul. 4, 2024

(30) Foreign Application Priority Data

Dec. 30, 2022  (TW) .................................. 111150852

(51) Int. Cl.
B62J 9/26 (2020.01)
B62J 9/14 (2020.01)
B62J 9/40 (2020.01)

(52) U.S. Cl.
CPC .. B62J 9/14 (2020.02); B62J 9/40 (2020.02)

(58) Field of Classification Search
CPC B62J 9/26; B62J 9/22; B62J 9/27; B62J 9/40
USPC ........................................................ 224/427
See application file for complete search history.

(56) References Cited

U.S. PATENT DOCUMENTS

| 4,079,872 A * | 3/1978 | Halter | B62J 9/27 224/418 |
| 4,566,617 A * | 1/1986 | Jackson | B62J 9/26 224/427 |
| 4,643,343 A * | 2/1987 | Goldman | B62J 9/26 224/427 |
| 4,921,151 A * | 5/1990 | Duvall | B62J 9/27 190/125 |
| 5,497,919 A * | 3/1996 | Klinger | A45C 7/0063 224/582 |
| 5,893,501 A * | 4/1999 | Schwimmer | B62J 9/26 224/427 |
| 8,777,075 B2 | 7/2014 | Bretl et al. | |
| 11,001,325 B2 | 5/2021 | Wilkey | |
| 2010/0059564 A1 | 3/2010 | Bretl et al. | |
| 2012/0187170 A1* | 7/2012 | Ho | B62J 9/27 224/441 |
| 2013/0207423 A1* | 8/2013 | Russell | B62J 1/20 297/188.2 |

FOREIGN PATENT DOCUMENTS

| TW | 547403 U | 8/2003 |
| TW | M378881 U | 4/2010 |
| TW | M396244 U | 1/2011 |
| TW | M459165 U | 8/2013 |
| TW | M466849 U | 12/2013 |
| TW | M541421 U | 5/2017 |

* cited by examiner

Primary Examiner — Adam J Waggenspack
(74) Attorney, Agent, or Firm — Muncy, Geissler, Olds & Lowe P.C.

(57) ABSTRACT

A bike saddle bag has a bag body and includes a fastening strap and at least one sling. The fastening strap has a first restraining part, a second restraining part, and a fixed part. The fixed part is joined to the bag body. The first and the second restraining parts extend oppositely from the fixed part and around the bag body and detachably connected with each other, thereby surrounding the bag body. The fastening strap and the at least one sling are in cooperation to allow the bag body to be hung on a bike saddle.

10 Claims, 9 Drawing Sheets

BIKE SADDLE BAG

BACKGROUND OF THE INVENTION

The present invention relates to a bike saddle bag and, particularly, to a bike saddle bag including a wrap-around fastening strap.

TW Patent No. 547403 discloses a bike saddle bag having a first end, a second end, and a top surface between the first and the second ends. The top surface has a seam near the first end and fixing straps extend from both ends of the seam. The length of the seam is greater than the distance between inner sides of the support rails of a bike saddle, making the fixing straps wrap around the corresponding support rails.

The two fixing straps wrapping around the support rails may allow the bag to couple to the saddle stably. The fixing straps, however, impede the access of items in the bag. Further, the fixing straps are unfastened in order to take out the items from the bag. The problem is that the bag falls off the saddle once the fixing straps are unfastened, resulting that the bag and the items are liable to become scratched and damaged.

The present invention is, therefore, intended to obviate or at least alleviate the problems encountered in the prior art.

SUMMARY OF THE INVENTION

A bike saddle bag has a bag body adapted for carrying objects and includes a fastening strap and at least one sling. The at least one sling is configured for attaching to saddle rails of a bike saddle to hang the bag body on the bike saddle. The fastening strap has a first end provided with a first restraining part, a second end provided with a second restraining part, a middle extending between the first and the second ends provided with a fixed part. The fixed part is joined to the bag body. The first and the second restraining parts extend oppositely from the fixed part and around the bag body and include ends detachably connected with each other, thereby surrounding the bag body. The fastening strap and the at least one sling in cooperation to allow the bag body to be hung on a bike saddle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components assembly forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purpose of the abstract is to enable the public generally, and especially scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

FIGS. 1-7 show a bike saddle bag 10 according to the present invention. The bike saddle bag 10 includes a bag body 20 adapted for carrying objects, a fastening strap 30, and at least one sling 40.

The fastening strap 30 has a first end provided with a first restraining part 31, a second end provided with a second restraining part 32, and a middle extending between the first and the second ends provided with a fixed part 33. The fixed part 33 is joined to the bag body 20. The fixed part 33 has a first side abutting the bag body 20 for joining to the bag body 20 and a second side opposite the first side. The fixed part 33 is sewed onto the bag body 20. The first and the second restraining parts 31 and 32 extend oppositely from the fixed part 33 and around the bag body 20 and include ends detachably connected with each other, thereby surrounding the bag body 20. When the first and the second restraining parts 31 and 32 are connected with each other, the fastening strap 30 impedes the access of the bag body 20. The first and the second restraining parts 31 and 32 have Velcro for detachably connecting with each other. The fastening strap 30 has a first length between the first restraining part 31 and the fixed part 33 adapted to hang on one saddle rail 91 of a bike saddle 90 and a second length between the second restraining part 32 and the fixed part 33 adapted to hang on another saddle rail 91 of the bike saddle 90. The bag body 20 and the first length of the fastening strap 30 enclose a first space for receiving one saddle rail 91.

The bag body 20 and the second length of the fastening strap 30 enclose a second space for receiving another saddle rail 91.

The fastening strap 30 and the at least one sling 40 are in cooperation to allow the bag body 20 to be hung on the bike saddle 90. The at least one sling includes a first sling 40 and a second sling 50. Each of the first and the second slings 40 and 50 has a fixed end 41 and 51 joined to the bag body 20. The first and the second slings 40 and 50 are sewed to the bag body 20. The fastening strap 30 has a first through hole 34 extending therethrough between the first restraining part 31 and the fixed part 33 and a second through hole 35 extending therethrough between the second restraining part 32 and the fixed part 33. The first sling 40 has a hanging end 42 inserted through the first through hole 34 and detachably connected with the second side of the fixed part 33. The first sling 40 has a length between the fixed end 41 and the hanging end 42 extending along the first length of the fastening strap 30. The second sling 50 has a hanging end 52 inserted through the second through hole 35 and detachably connected with the second side of the fixed part 33. The second sling 50 has a length between the fixed end 51 and the hanging end 52 extending along the second length of the fastening strap 30. The hanging ends 42 and 52 and the second side of the fixed part 33 have Velcro for detachably connecting with each other.

Additionally, the bike saddle bag 10 includes a supplementary holding area 21, which is external to the bag body 20, adapted for carrying objects. The supplementary holding area 21 has a compartment adapted for carrying an air cartridge. The bag body 20 and the supplementary holding area 21 are held together. The supplementary holding area 21 is disposed outside the bag body 20 and in a place not impeding the access of the bag body 20. When the ends of the first and the second restraining parts 31 and 32 are connected with each other, the supplementary holding area 21 is tied to the bag body 20 by the fastening strap 30. The fixed part 33 of the fastening strap 30 and the supplementary holding area 21 are disposed on opposite sides of the bag body 20. The supplementary holding area 21 is restrained to the bag body 20 with two lateral edges thereof fixedly joined to two sides of the bag body 20.

FIGS. 4 through 7 show a bike saddle bag 10a in accordance with a second embodiment of the present invention, and the same numbers are used to correlate similar components of the first embodiment, but bearing a letter a. As an initial matter, for brevity, many of the details discussed with reference to the previous FIGS. 1-3 may not be discussed or repeated hereafter. The bike saddle bag 10a includes a bag body 20a and a fastening strap 30a. The fastening strap 30a has a first restraining part 31a, a second restraining part 32a, and a fixed part 33a. The fixed part 33a has a first side abutting the bag body 20a for joining to the bag body 20a and a second side. The second embodiment is different from the first embodiment in that at least one sling 60a has a fixed segment 63a joined to the second side of the fixed part 33a. The fixed segment 63a is sewed onto the fixed part 33a. The fixed segment 63a has a first side abutting the second side of the fixed part 33a for joining to the second side of the fixed part 33a and a second side opposite the first side. The at least one sling 60a has a first hanging segment 61a adapted to hang on one saddle rail 91 of the bike saddle 90 extending from a first end of the fixed segment 63a and detachably connected with the second side of the fixed segment 63a. The first hanging segment 61a encloses a space for receiving one saddle rail 91. The at least one sling 60a has a second hanging segment 62a adapted to hang on another saddle rail 91 of the bike saddle 90 extending from a second end of the fixed segment 63a and detachably connected with the second side of the fixed segment 63a. The second hanging segment 62a encloses a space for receiving another saddle rail 91. Additionally, a supplementary holding area 24a has a first part which has a restrained end joined to a front end 22a of the bag body 20a and a non-restrained end, and a second part which has a restrained end joined to a rear end 23a of the bag body 20a and a non-restrained end. The non-restrained ends of the first and the second parts are detachably connected with each other. When the first and the second parts are not connected with each other, the first and the second parts are suspended from the bag body 20a. When the first and the second parts are connected with each other, the non-restrained ends of the first and the second parts are connected with each other and restrained.

Figure 1:
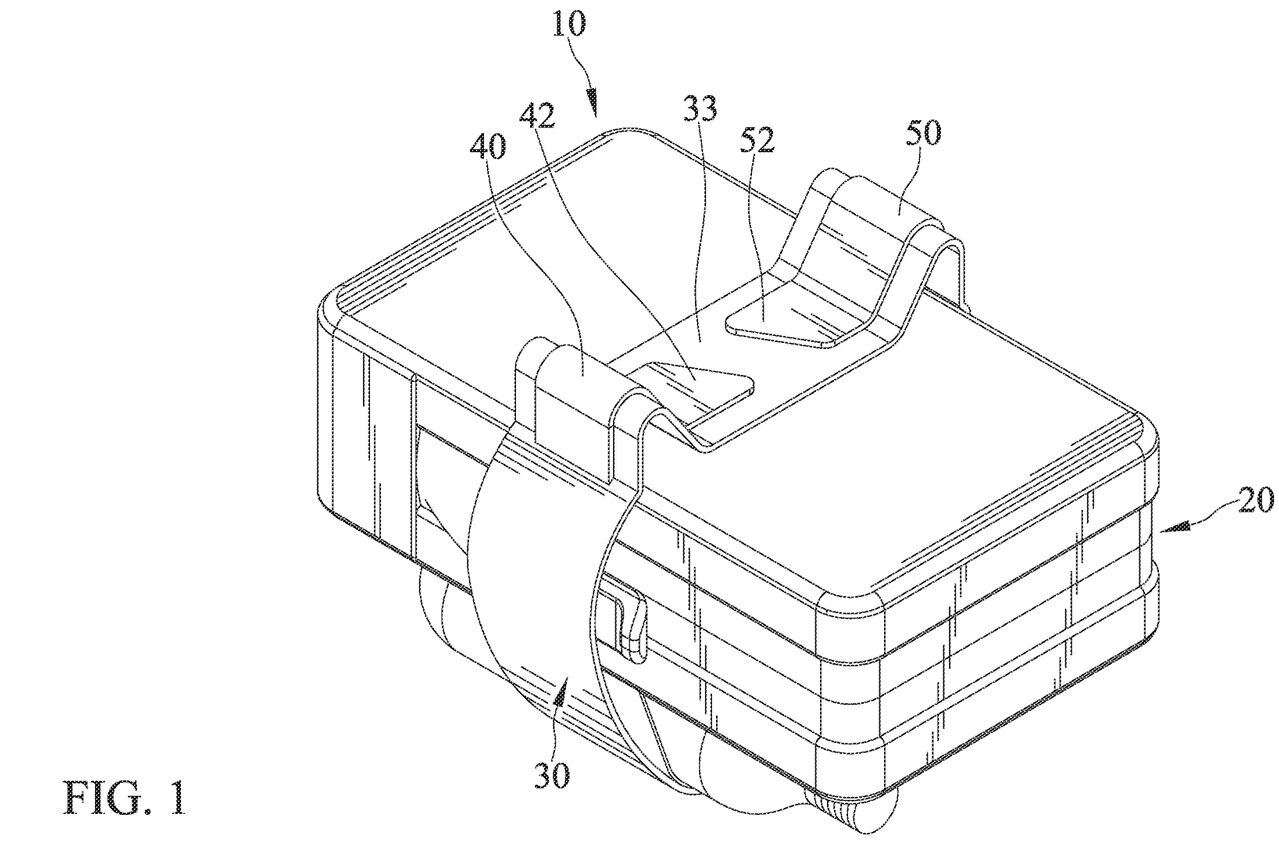
FIG. 1 is a perspective view of a bike saddle bag in accordance with a first embodiment of the present invention.
Figure 2:
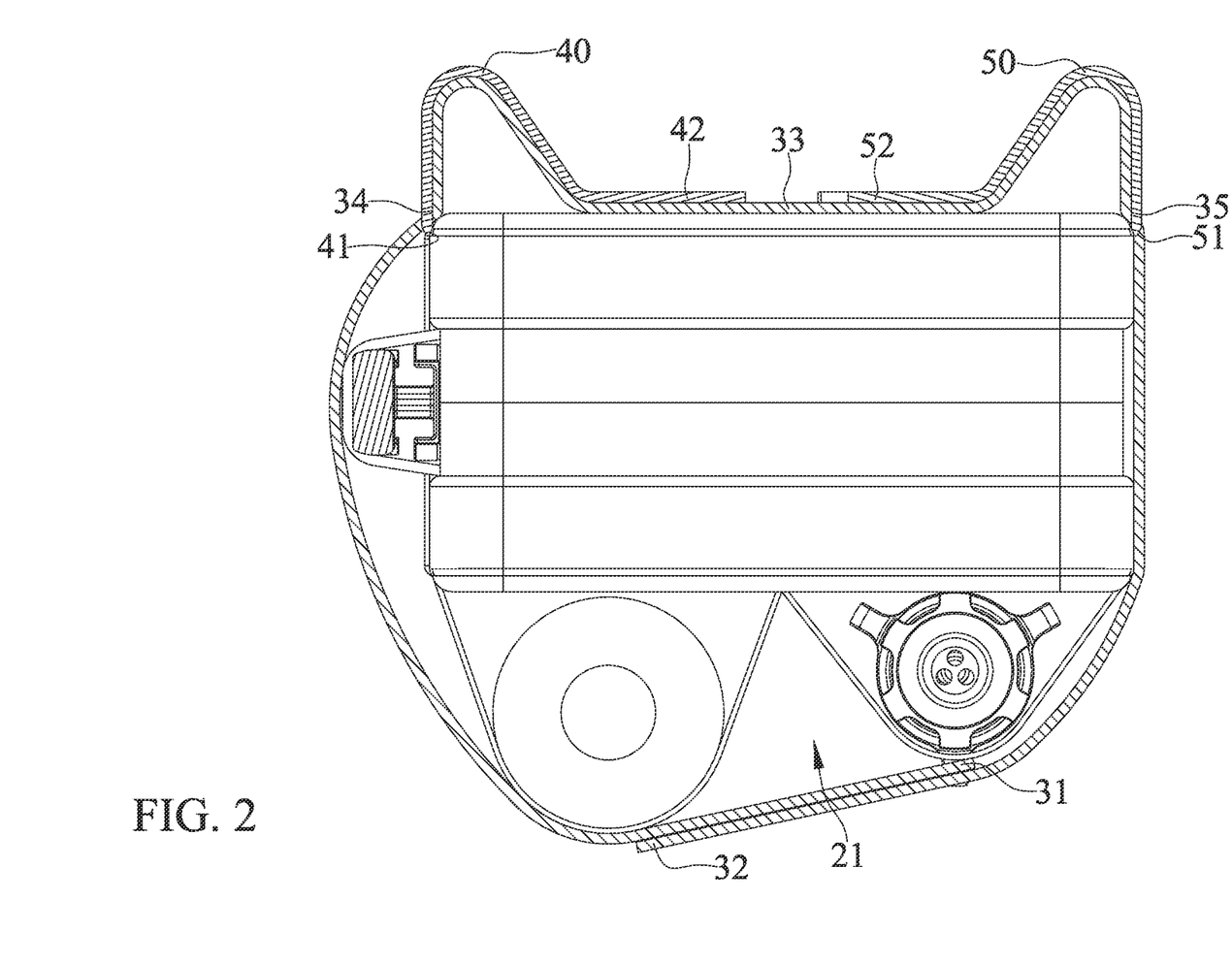
FIG. 2 is a cross-sectional view of the bike saddle bag of FIG. 1.
Figure 3:
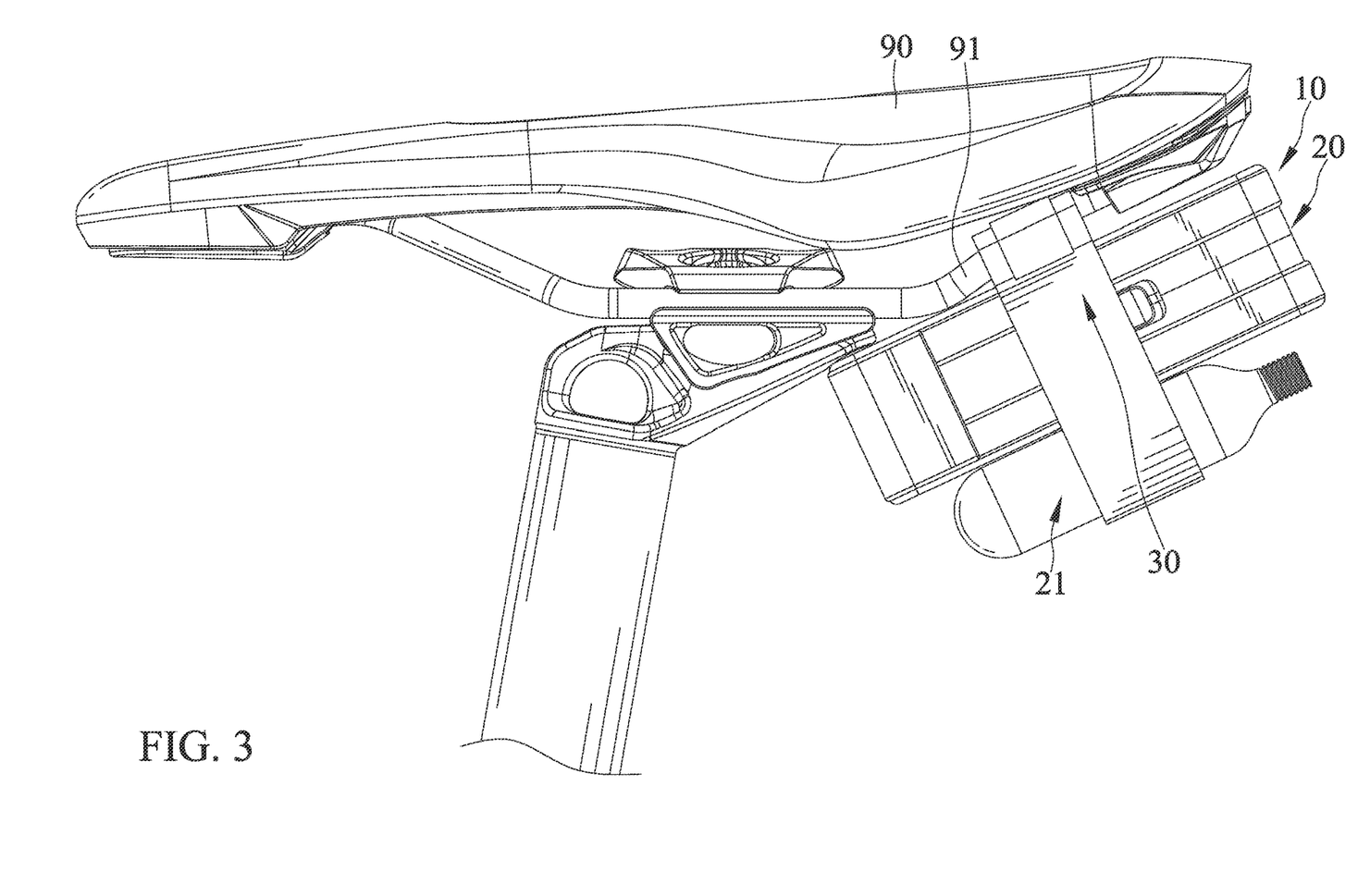
FIG. 3 illustrates the bike saddle bag of FIG. 1 joined to a bike saddle.
Figure 4:
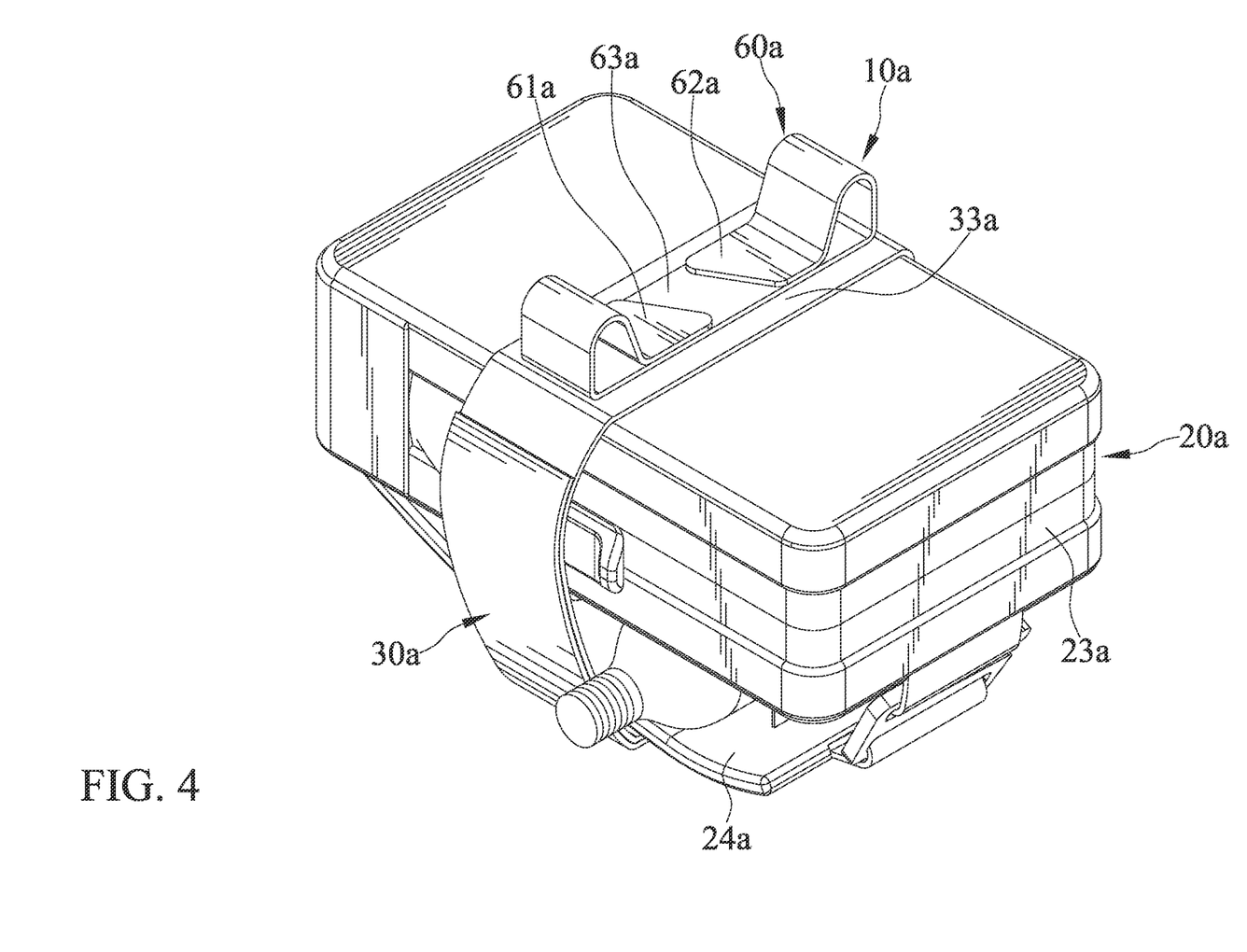
FIG. 4 is a perspective view of a bike saddle bag in accordance with a second embodiment of the present invention.
Figure 5:
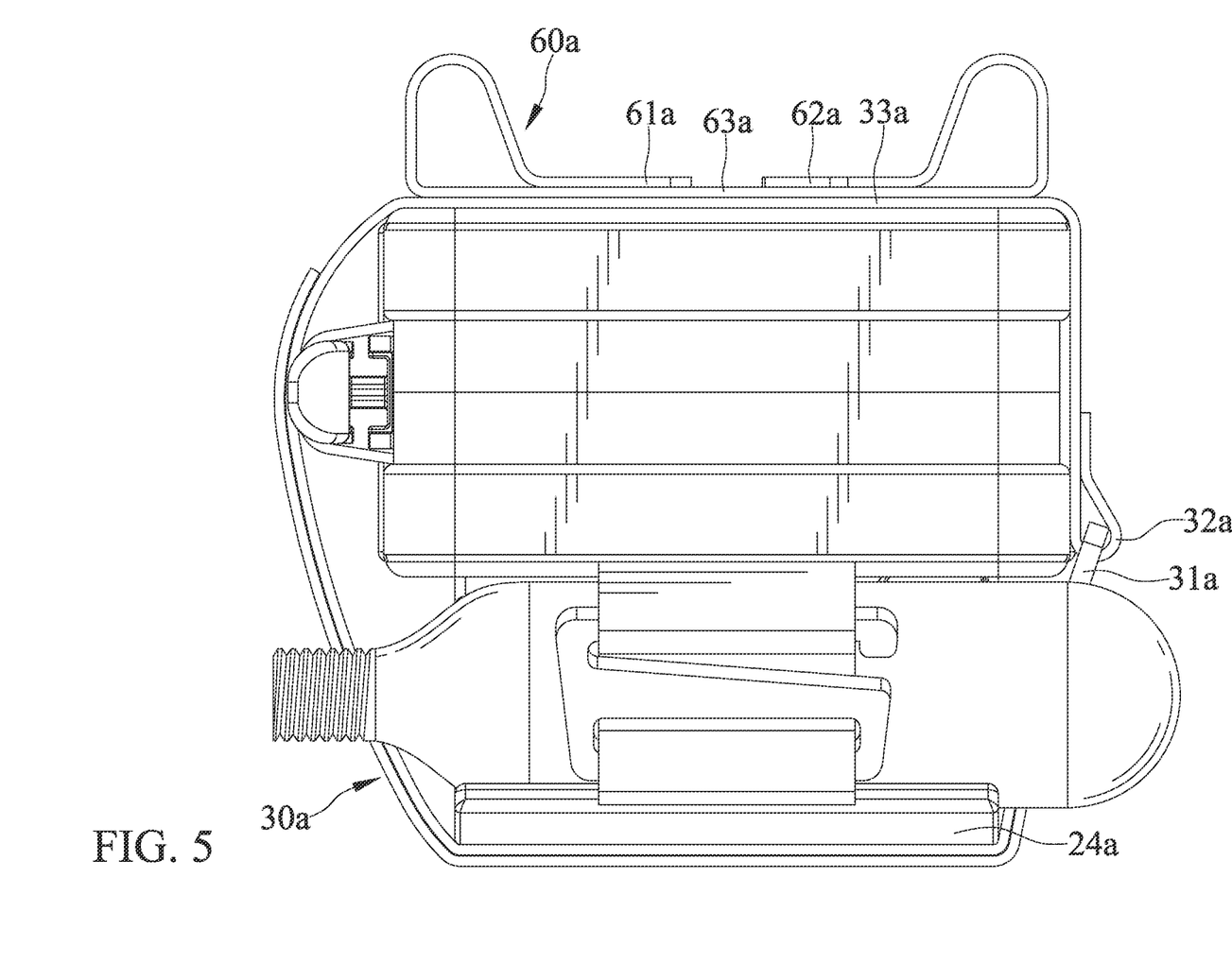
FIG. 5 is a side view of the bike saddle bag of FIG. 4.
Figure 6:
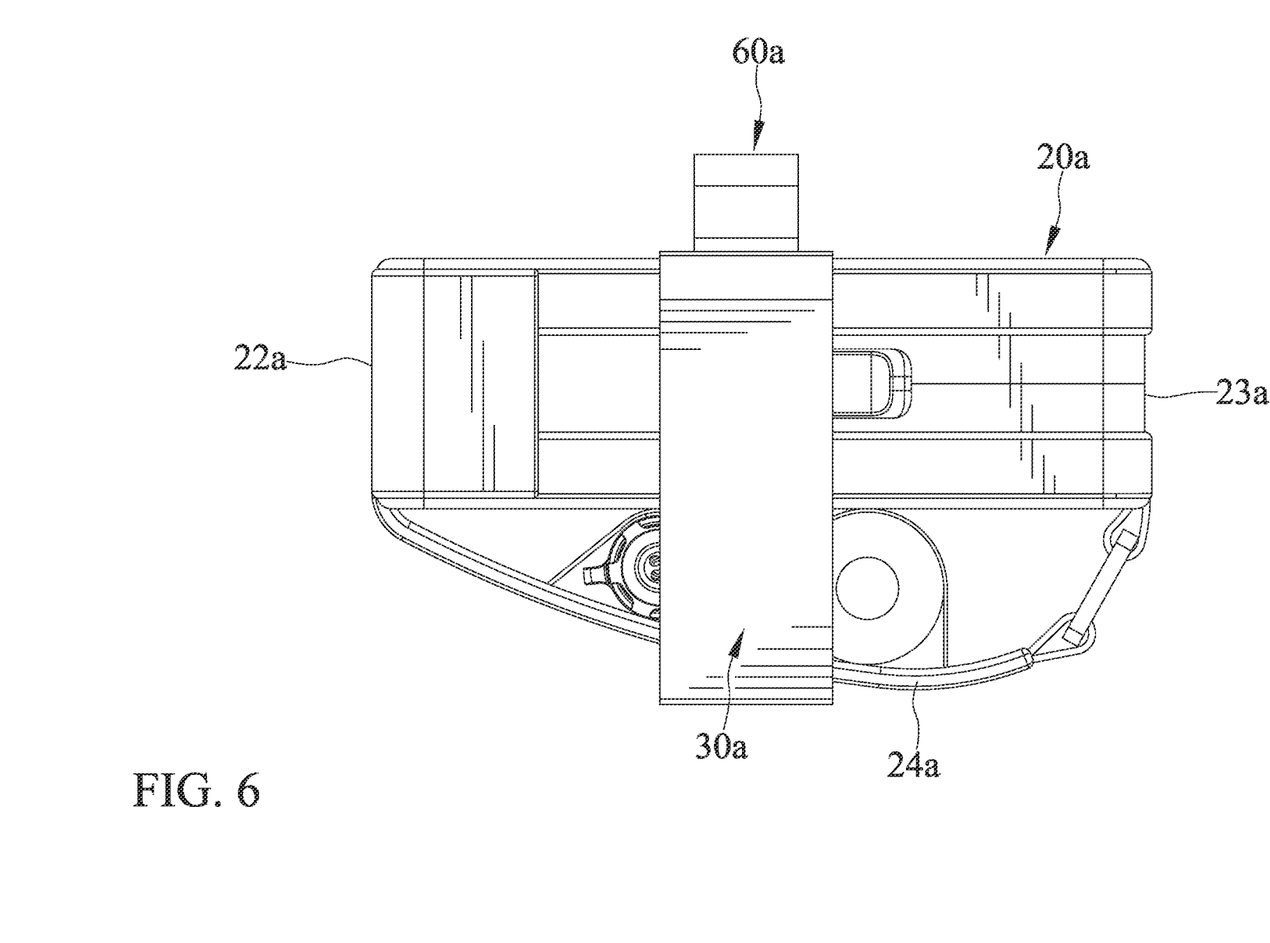
FIG. 6 is another side view of the bike saddle bag of FIG. 4.
Figure 7:
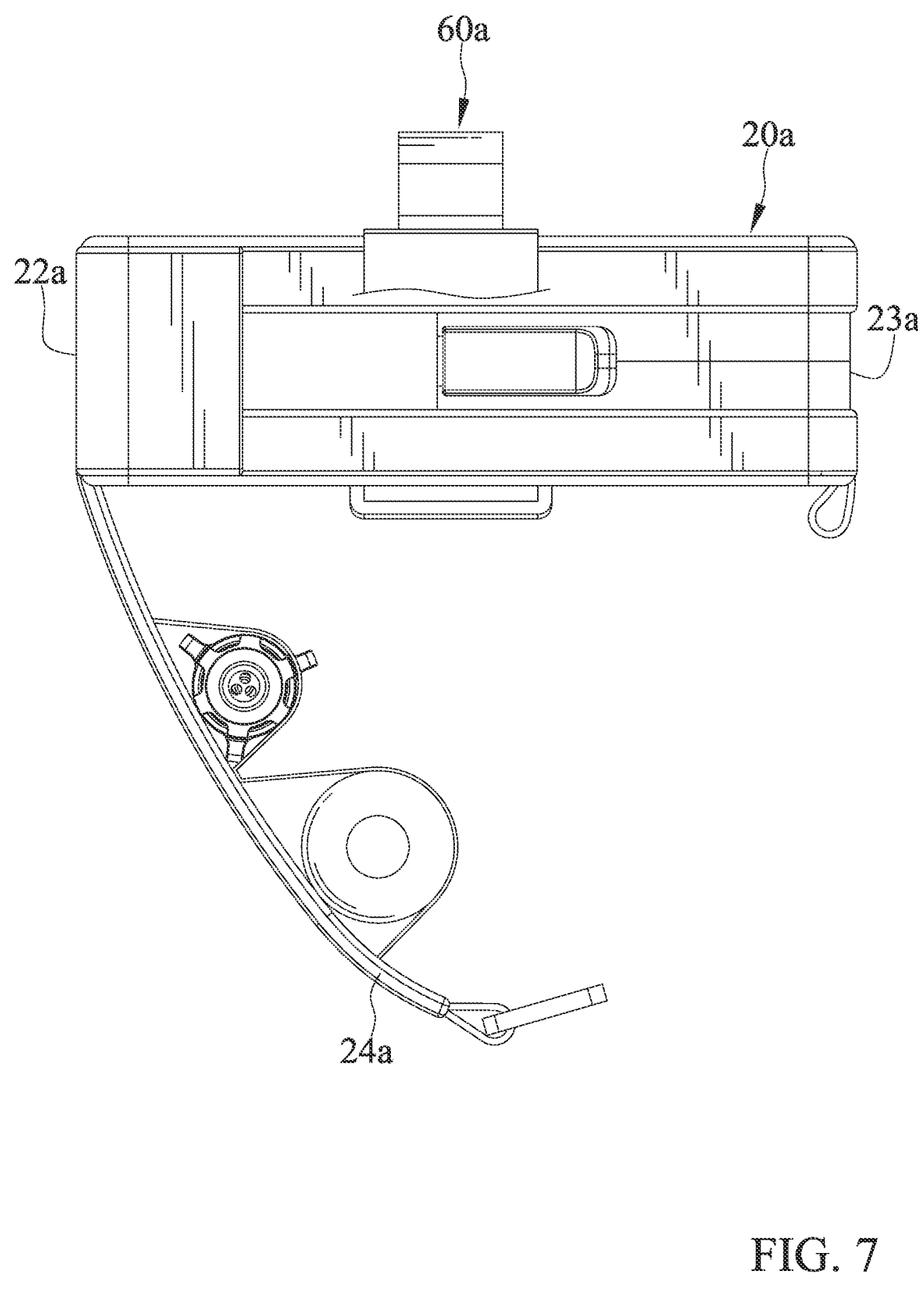
FIG. 7 illustrates a supplementary holder of the bike saddle bag of FIG. 4 in an open position.
Figure 8:
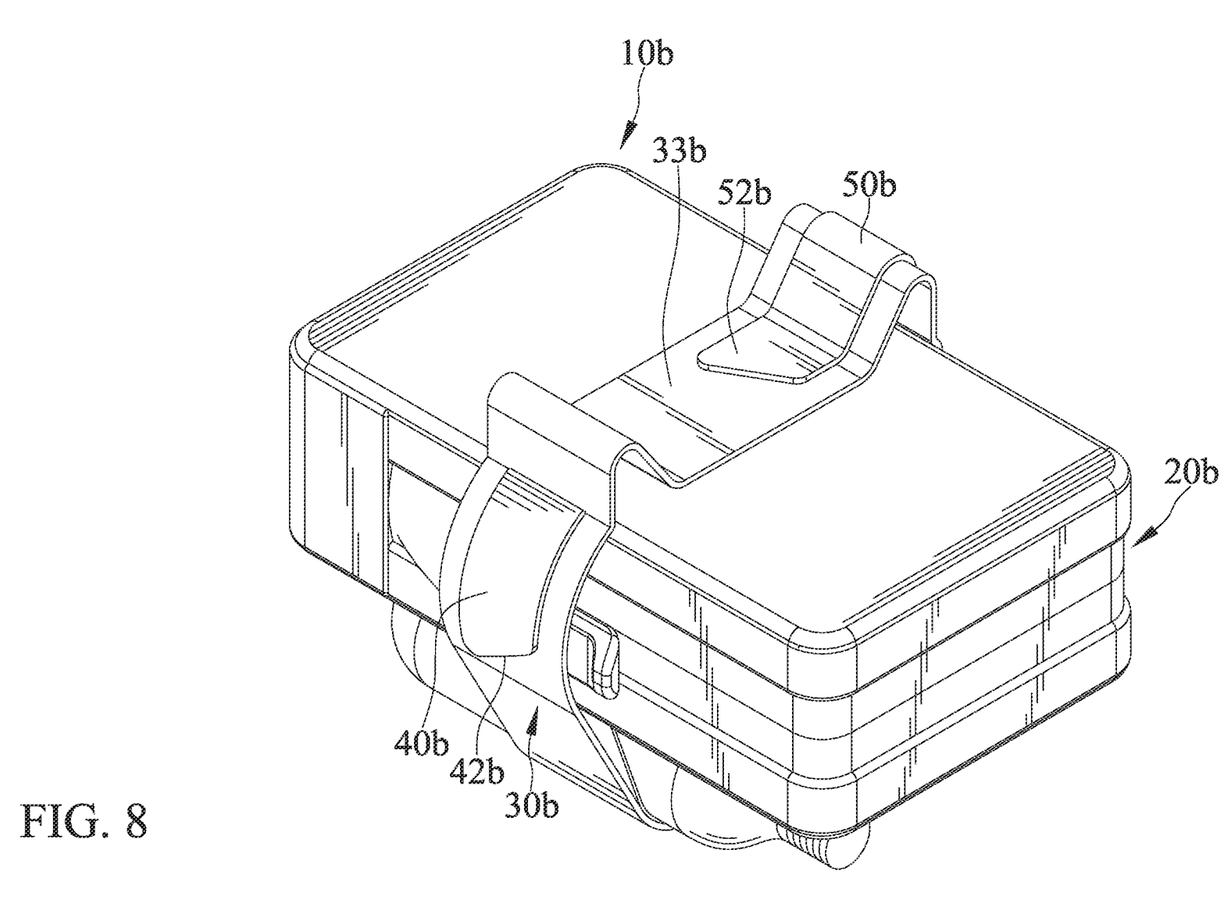
FIG. 8 is a perspective view of a bike saddle bag in accordance with a third embodiment of the present invention.
Figure 9:
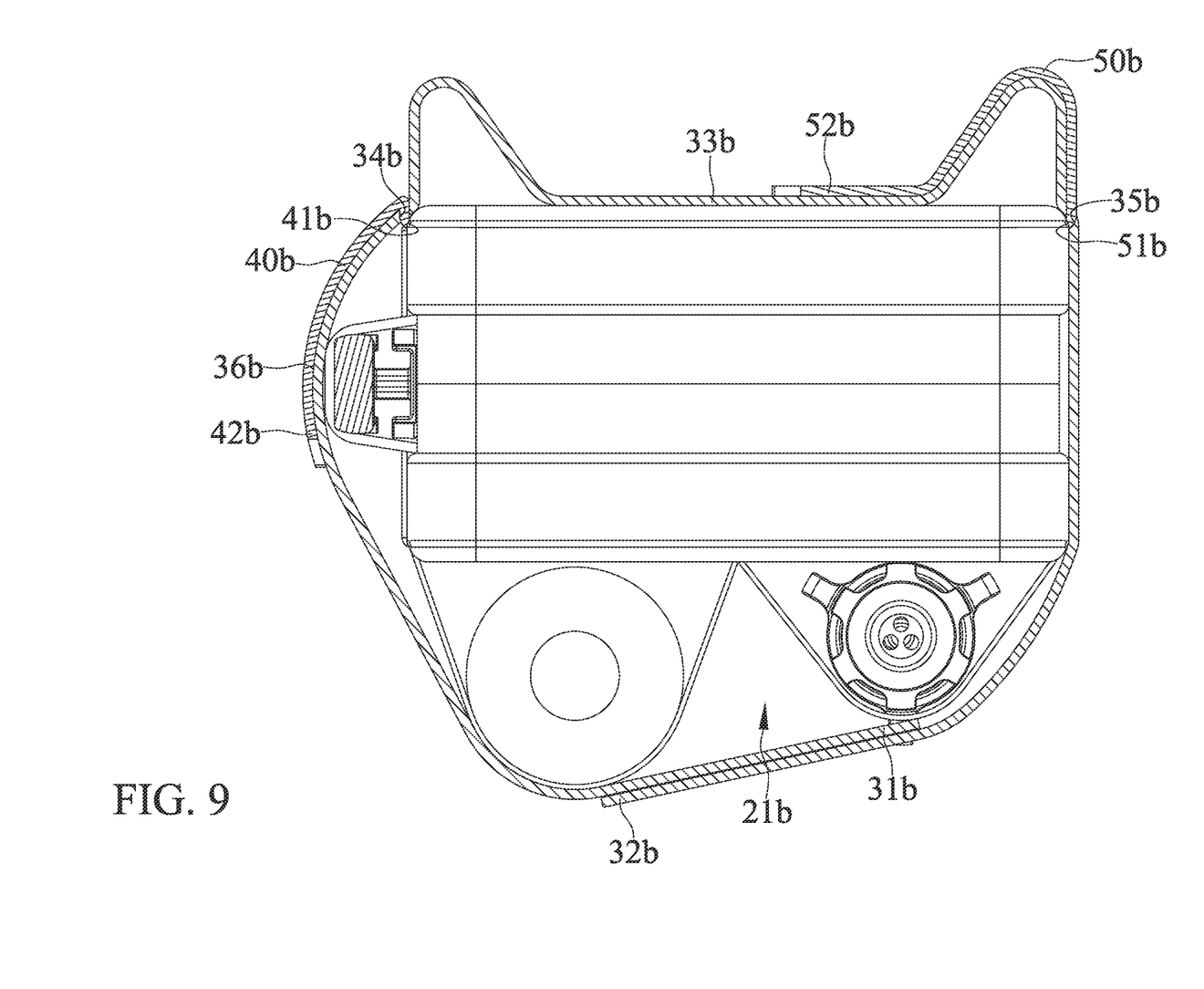
FIG. 9 is a cross-sectional view of the bike saddle bag of FIG. 8.

FIGS. 8 and 9 show a bike saddle bag 10b in accordance with a third embodiment of the present invention, and the same numbers are used to correlate similar components of the first embodiment, but bearing a letter b. As an initial matter, for brevity, many of the details discussed with reference to the previous FIGS. 1-3 may not be discussed or repeated hereafter. The bike saddle bag 10b includes a bag body 20b, a fastening strap 30b, and at least one sling 40b. The fastening strap 30b has a first restraining part 31b, a second restraining part 32b, and a fixed part 33b. The fixed part 33b has a first side abutting the bag body 20b for joining to the bag body 20b and a second side. The at least one sling includes a first sling 40b and a second sling 50b. The fastening strap 30b has a first through hole 34b extending therethrough between the first restraining part 31b and the fixed part 33b and a second through hole 35b extending therethrough between the second restraining part 32b and the fixed part 33b. A supplementary holding area 21b is restrained to the bag body 20b with two lateral edges thereof fixedly joined to two sides of the bag body 20b. The third embodiment is different from the first embodiment in that the fastening strap 30b has a third length defining a connection part 36b between the first restraining part 31b and the fixed part 33b. The first sling 40b has a hanging end 42b inserted through the first through hole 34b and detachably connected with the connection part 36b. The second sling 50b has a hanging end 52b inserted through the second through hole 35b and detachably connected with the second side of the fixed part 33b. The second sling 50b has a length between the fixed end 51b and the hanging end 52b extending along the second length of the fastening strap 30b.

In view of the foregoing, either the bag bodies 20, 20a, 20b or the supplementary holding areas 21, 24a, 21b can be accessed with losing connection to the saddle rails 91 of the bike saddle 90.

Although specific embodiments have been illustrated and described, numerous modifications and variations are still possible without departing from the scope of the invention. The scope of the invention is limited by the accompanying claims.

The invention claimed is:

1. A bike saddle bag comprising:
   a bag body adapted for carrying objects;
   a fastening strap having a first end provided with a first restraining part, a second end provided with a second restraining part, and a middle extending between the first and the second ends provided with a fixed part, wherein the fixed part is joined to the bag body, and wherein the first and the second restraining parts extend oppositely from the fixed part and around the bag body and include ends detachably connected with each other, thereby surrounding the bag body; and at least one sling;

wherein the fastening strap and the at least one sling are in cooperation to allow the bag body to be hung on a bike saddle;

wherein the fixed part has a first side abutting the bag body for joining to the bag body and a second side opposite the first side, wherein the at least one sling includes a first sling and a second sling, wherein the fastening strap has a first through hole extending therethrough between the first restraining part and the fixed part and a second through hole extending therethrough between the second restraining part and the fixed part, wherein each of the first and the second slings has a fixed end joined to the bag body, wherein the fastening strap has a first length between the first restraining part and the fixed part adapted to hang on one saddle rail of the bike saddle and a second length between the second restraining part and the fixed part adapted to hang on another saddle rail of the bike saddle, wherein the bag body and the first length of the fastening strap enclose a first space for receiving one saddle rail, and wherein the bag body and the second length of the fastening strap enclose a second space for receiving another saddle rail.

2. The bike saddle bag as claimed in claim 1, wherein the first sling has a hanging end inserted through the first through hole and detachably connected with the second side of the fixed part, wherein the first sling has a length between the fixed end and the hanging end extending along the first length of the fastening strap, wherein the second sling has a hanging end inserted through the second through hole and detachably connected with the second side of the fixed part, and wherein the second sling has a length between the fixed end and the hanging end extending along the second length of the fastening strap.

3. A bike saddle bag comprising:
a bag body adapted for carrying objects;
a fastening strap having a first end provided with a first restraining part, a second end provided with a second restraining part, and a middle extending between the first and the second ends provided with a fixed part, wherein the fixed part is joined to the bag body, and wherein the first and the second restraining parts extend oppositely from the fixed part and around the bag body and include ends detachably connected with each other, thereby surrounding the bag body; and at least one sling;

wherein the fastening strap and the at least one sling are in cooperation to allow the bag body to be hung on a bike saddle wherein the fixed part has a first side abutting the bag body for joining to the bag body and a second side opposite the first side, wherein the at least one sling has a fixed segment joined to the second side of the fixed part, wherein the fixed segment has a first side abutting the second side of the fixed part for joining to the second side of the fixed part and a second side opposite the first side, wherein the at least one sling has a first hanging segment adapted to hang on one saddle rail of the bike saddle extending from a first end of the fixed segment and detachably connected with the second side of the fixed segment, wherein the first hanging segment encloses a space for receiving one saddle rail, wherein the at least one sling has a second hanging segment adapted to hang on another saddle rail of the bike saddle extending from a second end of the fixed segment and detachably connected with the second side of the fixed segment, and wherein the second hanging segment encloses a space for receiving another saddle rail.

4. The bike saddle bag as claimed in claim 1, wherein the fastening strap has a third length defining a connection part between the first restraining part and the fixed part, wherein the first sling has a hanging end inserted through the first through hole and detachably connected with the connection part, wherein the second sling has a hanging end inserted through the second through hole and detachably connected with the second side of the fixed part, and wherein the second sling has a length between the fixed end and the hanging end extending along the second length of the fastening strap.

5. The bike saddle bag as claimed in claim 1 further comprising a supplementary holding area, which is external to the bag body, adapted for carrying objects, wherein the bag body and the supplementary holding area are held together, wherein the supplementary holding area is disposed outside the bag body and in a place not impeding the access of the bag body, and wherein when the ends of the first and the second restraining parts are connected with each other, the supplementary holding area is tied to the bag body by the fastening strap.

6. The bike saddle bag as claimed in claim 5, wherein the supplementary holding area has a compartment adapted for carrying an air cartridge.

7. The bike saddle bag as claimed in claim 5, wherein the supplementary holding area is restrained to the bag body with two lateral edges thereof fixedly joined to two sides of the bag body.

8. The bike saddle bag as claimed in claim 5, wherein the supplementary holding area has a first part which has a restrained end joined to a front end of the bag body and a non-restrained end, and a second part which has a restrained end joined to a rear end of the bag body and a non-restrained end, wherein the non-restrained ends of the first and the second parts are detachably connected with each other, wherein when the first and the second parts are not connected with each other, the first and the second parts are suspended from the bag body, and wherein when the first and the second parts are connected with each other, the non-restrained ends of the first and the second parts are connected with each other and restrained.

9. The bike saddle bag as claimed in claim 1, wherein when the first and the second restraining parts are connected with each other, the fastening strap impedes the access of the bag body.

10. The bike saddle bag as claimed in claim 3, wherein when the first and the second restraining parts are connected with each other, the fastening strap impedes the access of the bag body.

* * * * *